United States Patent
Domröse et al.

(10) Patent No.: US 10,946,581 B2
(45) Date of Patent: Mar. 16, 2021

(54) METHOD FOR CALIBRATING AN APPARATUS FOR MANUFACTURING A THREE-DIMENSIONAL OBJECT

(71) Applicant: EOS GmbH Electro Optical Systems, Krailling (DE)

(72) Inventors: Robert Achim Domröse, Germering (DE); Dominik Wolf, Munich (DE); Michael Göth, Munich (DE); Ulrich Schmid, Diessen am Ammersee (DE); Maximilian Mittermüller, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 298 days.

(21) Appl. No.: 16/063,474

(22) PCT Filed: Dec. 20, 2016

(86) PCT No.: PCT/EP2016/081918
§ 371 (c)(1),
(2) Date: Jun. 18, 2018

(87) PCT Pub. No.: WO2017/118569
PCT Pub. Date: Jul. 13, 2017

(65) Prior Publication Data
US 2018/0370146 A1   Dec. 27, 2018

(30) Foreign Application Priority Data
Jan. 5, 2016   (DE) .................... 10 2016 200 043.8

(51) Int. Cl.
*B29C 64/393*   (2017.01)
*B29C 64/153*   (2017.01)
(Continued)

(52) U.S. Cl.
CPC .......... *B29C 64/153* (2017.08); *B29C 64/268* (2017.08); *B29C 64/393* (2017.08);
(Continued)

(58) Field of Classification Search
CPC ... B29C 64/153; B29C 64/268; B29C 64/393; B33Y 10/00; B33Y 30/00; B33Y 40/00; B33Y 50/00; B33Y 50/02
(Continued)

(56) References Cited

U.S. PATENT DOCUMENTS

| | | |
|---|---|---|
| 5,730,925 A | 3/1998 | Mattes et al. |
| 6,483,596 B1 | 11/2002 | Philippi et al. |

(Continued)

FOREIGN PATENT DOCUMENTS

| | | |
|---|---|---|
| CN | 101821081 | 9/2010 |
| CN | 101932429 | 12/2010 |

(Continued)

OTHER PUBLICATIONS

International Search Report for Application No. PCT/EP2016/081918 dated Mar. 30, 2017, 4 pages.

*Primary Examiner* — John H Le
(74) *Attorney, Agent, or Firm* — Seyfarth Shaw LLP

(57) ABSTRACT

Method for calibrating an apparatus for manufacturing a three-dimensional object by layer-wise selective solidification of building material with the step of generating an substantially periodic first modulation pattern in a first sub-area of the build area, the step of generating an substantially periodic second modulation pattern in a second sub-area of the build area, wherein in the overlap zone, the first modulation pattern and the second modulation pattern form an substantially periodic superposition pattern, whose period is larger than the period of the first modulation pattern and the period of the second modulation pattern, the step of (Continued)

detecting the superposition pattern, and the step of determining the deviation of the position of the superposition pattern on the build area from a reference position.

15 Claims, 4 Drawing Sheets

(51) Int. Cl.
| | |
|---|---|
| *B29C 64/268* | (2017.01) |
| *B33Y 50/02* | (2015.01) |
| *B33Y 40/00* | (2020.01) |
| *B33Y 10/00* | (2015.01) |
| *B33Y 30/00* | (2015.01) |
| *B33Y 50/00* | (2015.01) |

(52) U.S. Cl.
CPC ............... *B33Y 10/00* (2014.12); *B33Y 30/00* (2014.12); *B33Y 40/00* (2014.12); *B33Y 50/00* (2014.12); *B33Y 50/02* (2014.12)

(58) Field of Classification Search
USPC .......................... 702/85, 92, 93, 95; 264/410
See application file for complete search history.

(56) References Cited

U.S. PATENT DOCUMENTS

| | | | | |
|---|---|---|---|---|
| 8,784,721 | B2* | 7/2014 | Philippi | ................. B33Y 10/00 |
| | | | | 264/410 |
| 10,336,008 | B2* | 7/2019 | Perret | ................... B29C 64/393 |
| 2005/0051935 | A1 | 3/2005 | Lanterman et al. | |
| 2009/0017220 | A1 | 1/2009 | Muller et al. | |
| 2009/0060386 | A1 | 3/2009 | Cooper et al. | |
| 2013/0168902 | A1 | 7/2013 | Herzog et al. | |
| 2015/0045935 | A1 | 2/2015 | Cao et al. | |
| 2015/0283761 | A1 | 10/2015 | Maeda et al. | |
| 2015/0323318 | A1 | 11/2015 | Hess et al. | |
| 2016/0082668 | A1 | 3/2016 | Perret et al. | |

FOREIGN PATENT DOCUMENTS

| | | |
|---|---|---|
| CN | 103025507 | 4/2013 |
| CN | 104972120 | 10/2015 |
| CN | 104999670 | 10/2015 |
| DE | 19514740 | 4/1996 |
| DE | 19918613 | 11/2000 |
| DE | 102013208651 | 11/2014 |
| EP | 2942130 | 5/2014 |
| WO | 2015040433 | 3/2015 |

* cited by examiner fig. 3
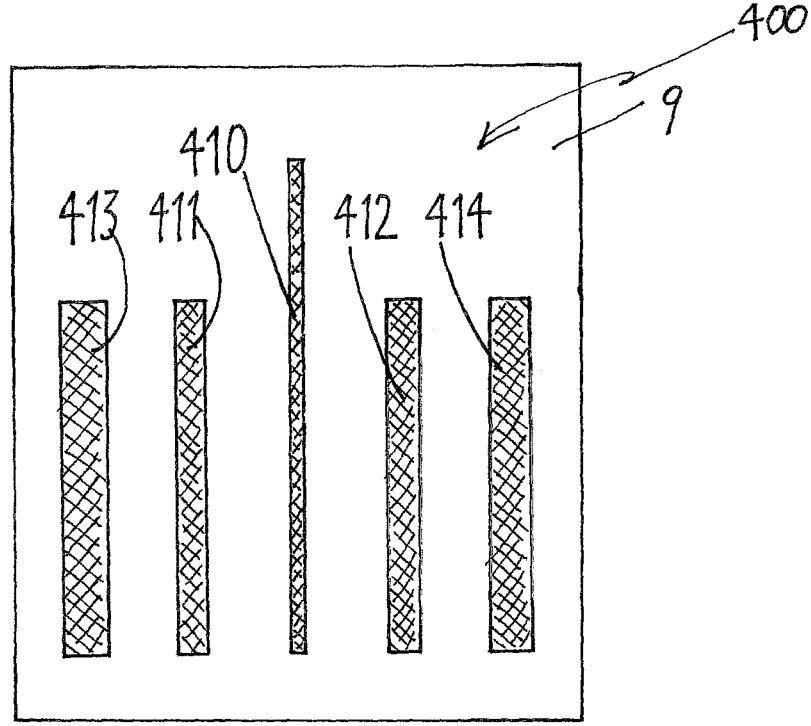
A
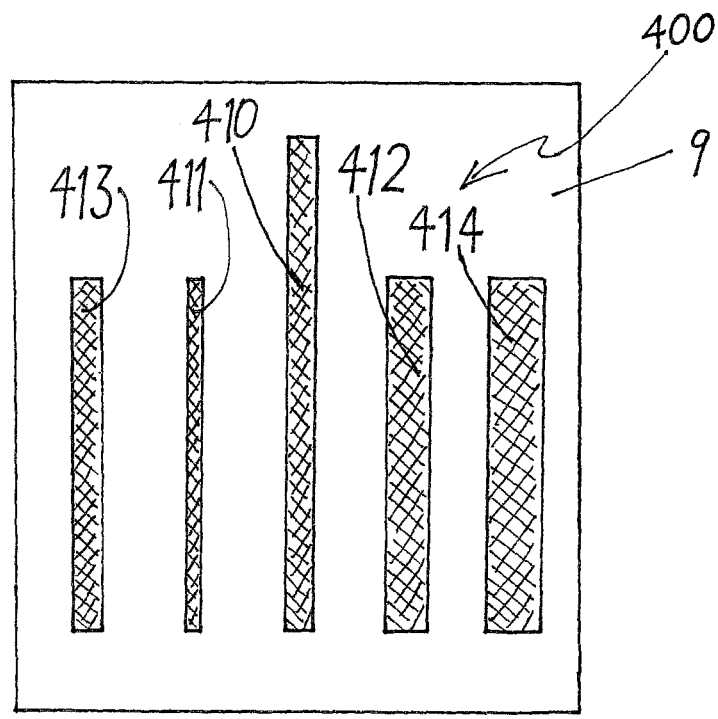
B

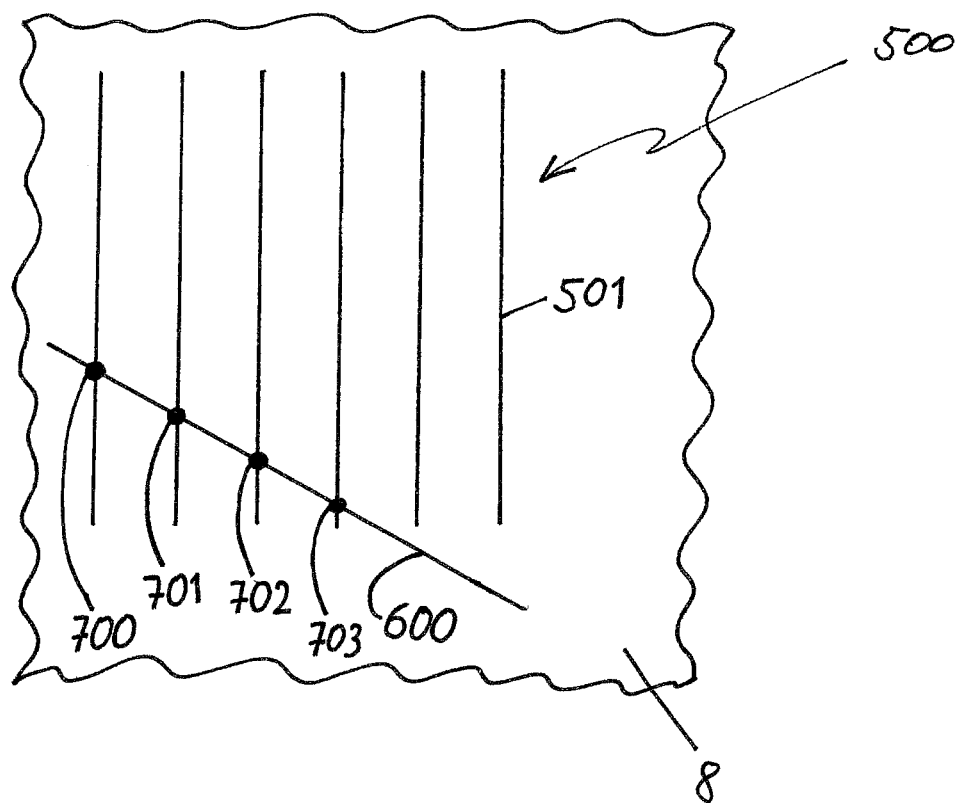

METHOD FOR CALIBRATING AN APPARATUS FOR MANUFACTURING A THREE-DIMENSIONAL OBJECT

TECHNICAL FIELD OF THE INVENTION

The invention relates to a method for calibrating an apparatus for manufacturing a three-dimensional object by layer-wise solidification of building material at the positions corresponding to the cross-section of the three-dimensional object to be manufactured in a respective layer and to such an apparatus that executes the method.

BACKGROUND OF THE INVENTION

Apparatuses for manufacturing a three-dimensional object by layer-wise selective solidification of a building material by means of electromagnetic radiation and/or particle radiation as well as corresponding methods are, for instance, used for rapid prototyping, rapid tooling, rapid manufacturing, and additive manufacturing, respectively. An example of such a method which is known as "selective laser sintering" or "selective laser melting" and a corresponding apparatus for executing the method are described in the document DE 195 14 740 C1.

A method for calibrating an apparatus for manufacturing a three-dimensional object is known from DE 199 18 613 A1, wherein the method is configured for only one laser beam. Besides, the method has to be executed prior to the actual building process.

In addition, it is known to use multiple laser beams within such an apparatus, to each of which a sub-area of the build area is assigned, wherein the sub-areas partially overlap each other. A method for automatically calibrating such an apparatus which has multiple lasers is known from the document DE 10 2013 208 651 A1. In this context, the deviation between test patterns or the deviation between test patterns and reference patterns is determined and changed in such a way that it falls below a setpoint value. In this context, test patterns and reference patterns may be dot patterns or grid patterns.

A drawback of the known calibration methods is their potentially limited accuracy.

SUMMARY OF THE INVENTION

It is an object of the invention to provide an improved method for calibrating an apparatus for manufacturing a three-dimensional object by layer-wise selective solidification of a building material and an apparatus for executing an improved method.

In the context of the invention (as well as in the context of the above statements), the concept of calibrating and calibration, respectively, is apprehended in its broader sense, that is to say in a colloquial sense. This means that not (necessarily) the determination of the accuracy of a measuring device is concerned but rather the adjustment of a first technical means of an apparatus (here, the apparatus for manufacturing a three-dimensional object) relative to a second technical means, in particular their positioning and/or orientation relative to each other. More precisely, one could speak of a "test and/or adjustment procedure" in connection with the expression "calibrating/calibration".

The object is achieved by a method according to claim 1, a method according to claim 10, an apparatus according to claim 12, and a calibration unit according to claim 15. Refinements of the invention are specified in the dependent claims, wherein the features specified in the respective dependent claims with respect to the individual claim categories may also be understood as refinement of all other claim categories.

The method according to the invention is a method for calibrating an apparatus for manufacturing a three-dimensional object by layer-wise solidification of building material at the positions corresponding to the cross-section of the object to be manufactured in a respective layer, the apparatus having a build space, in which a build area is provided and in which the object is to be built layer by layer by means of solidifying the building material, wherein the build area comprises at least a first sub-area and a second sub-area, which overlap in an overlap zone, and having a solidification device for emitting beams of electromagnetic radiation or particle beams to selective positions of the build area. The method comprises the step of generating an substantially periodic first modulation pattern in a layer of the building material or on a target in a first sub-area of the build area. The method comprises the step of generating an substantially periodic second modulation pattern in a layer of the building material or on a target in a second sub-area of the build area. In the overlap zone, the first modulation pattern and the second modulation pattern form an substantially periodic superposition pattern. The period of the superposition pattern is larger than the period of the first modulation pattern and the period of the second modulation pattern. The method comprises the step of detecting the superposition pattern. The method comprises the step of determining the deviation of the position of the superposition pattern on the build area from a reference position. In this way, for instance, a method is provided which allows for a calibration with high accuracy.

With the method according to the invention, the manufacture of the three-dimensional object with high (increased) dimensional accuracy is made possible. In addition, the inventive method allows for the manufacture of three-dimensional objects having a very filgree character as the precision required for the solidification of building material for manufacturing delicate structures is achieved.

Preferably, line patterns, grid patterns, or dot patterns are generated as substantially periodic modulation patterns. In this way, for instance, substantially periodic modulation patterns may be relatively easily generated.

Preferably, the reference position is defined by at least one reference mark on the build area, wherein the at least one reference mark is generated by the solidification device in a layer of the building material or on a target. In this way, it may, for instance, become possible to determine the reference position together with the detection of the superposition pattern.

Preferably, the solidification device emits beams of electromagnetic radiation, in particular laser radiation, wherein different beams are emitted from different radiation sources or generated from the radiation emitted from one radiation source by means of beam splitting. For instance, a beam of electromagnetic radiation may be generated with less instrument-related effort than a particle beam. By using a beam emitted from a laser source, the melting or partial melting of building material may be controlled in an easier and more accurate way compared to the use of electromagnetic radiation from another radiation source.

Preferably, the position of the first modulation pattern and/or the second modulation pattern on the build area is changed such that the deviation of the position of the superposition pattern on the build area from a reference position has a value not exceeding a setpoint value. In this way, deviations occurring for a particular coordinate may, for instance, be corrected in a specific manner.

The determination of the deviation of the position of the superposition pattern on the build area from the reference position preferably comprises determining a displacement and/or a rotation. More preferably, on the basis of the determination of the displacement and/or rotation, a change of the position of the first and/or second modulation pattern, i.e., a change of the displacement and/or the rotation is carried out. In this way, various deviations may, for instance, be recognised and, if applicable, rectified.

Preferably, the inventive method is executed prior to manufacturing a three-dimensional object and/or during manufacturing a three-dimensional object and/or after manufacturing a three-dimensional object. Thereby, it may, for instance, be tested whether settings of an apparatus for selective laser sintering or laser melting exhibit any drift during the manufacturing process.

The determination of the deviation of the position of the superposition pattern on the build area from the reference position preferably comprises an automatic detection, in particular a sensor-based detection with a detection device, which comprises at least one radiation conductor and at least one radiation sensor. Thereby, for instance, the basis for an automatic calibration is provided.

Preferably, modified control commands for the operation of the apparatus for manufacturing the object to be manufactured are derived on the basis of the determined deviation of the position of the superposition pattern on the build area from the reference position in an automatic or semi-automatic way. In this way, for instance, an automatic correction of deviations is executed.

The inventive method according to another embodiment is a method for calibrating an apparatus for manufacturing a three-dimensional object by layer-wise solidification of a building material at the positions corresponding to the cross-section of the object to be manufactured in a respective layer, in which method an irradiation pattern is detected in a spatially resolved manner. The apparatus comprises a build space, in which a build area is provided and in which the object is to be built by selectively solidifying the building material. The apparatus comprises a solidification device for emitting at least one beam of electromagnetic radiation or at least one particle beam to selective positions of the build area. The apparatus comprises a detection device with at least one radiation sensor and optionally at least one radiation conductor. For example, a light-sensitive camera may be used as radiation sensor (in this case, the detection device is preferably formed without radiation conductor) or a photodiode (in this case, the detection device is preferably formed with a radiation conductor). The method comprises the step of generating an irradiation pattern on the build area in a layer of the building material or on a target. Optionally, the method comprises the step of coupling the electromagnetic radiation which is emitted from the building material or the target when generating an irradiation pattern into the radiation conductor (provided that a radiation conductor is present in the detection device). The method comprises the step of conducting the radiation to the radiation sensor. The method comprises the step of detecting the radiation by the radiation sensor and the step of deriving a calibration information on the basis of this detection. In this way, it may, for instance, be possible to execute a calibration on the basis of radiation which is emitted when generating an irradiation pattern and which is detected in a spatially resolved manner.

In particular, it is possible to combine this method with each of the methods described above.

Preferably, the calibration information is used for the automatic or semi-automatic adjustment of an optical setting of the solidification device, in particular a focus setting (especially a focus position setting). In this way, for instance, deviations of an optical setting from the setpoint setting may be rectified.

The inventive apparatus is an apparatus for manufacturing a three-dimensional object by layer-wise solidification of a building material at the positions corresponding to the cross-section of the object to be manufactured in a respective layer. The apparatus comprises a build space, in which a build area is provided and in which the object is to be built in a layer-wise manner by selectively solidifying the building material. The build area comprises at least a first sub-area and a second sub-area, which overlap in an overlap zone. The apparatus comprises a solidification device for emitting beams of electromagnetic radiation or particle beams to selective positions of the build area. The apparatus comprises a generation unit, which generates an substantially periodic first modulation pattern in a layer of the building material or on a target in a first sub-area of the build area during operation. The apparatus comprises a generation unit, which generates an substantially periodic second modulation pattern in a layer of the building material or on a target in a second sub-area of the build area during operation. In the overlap zone, the first modulation pattern and the second modulation pattern form an substantially periodic superposition pattern, whose period is larger than the period of the first modulation pattern and the period of the second modulation pattern. The apparatus comprises a detection device which is configured to detect the superposition pattern. The apparatus comprises a determination unit, which determines the deviation of the position of the superposition pattern on the build area from a reference position during operation. In this way, for instance, an apparatus is provided with which an inventive method may be executed.

Preferably, the solidification device comprises at least a first and a second deflecting device for deflecting a first and a second beam emitted from the solidification device, wherein a first sub-area of the build area is assigned to the first deflecting device and a second sub-area of the build area is assigned to a second sub-area of the build area. In this way, it may, for instance, be possible that the operation area of a beam is limited in the build area such that an excessively skew irradiation of the material to be solidified is avoided.

Preferably, the detection device comprises a sensor, which detects the radiation striking the overlap zone in a spatially resolved manner by detection of the temporary or permanent changes of a property of the building material or the target occurring as consequence of the incident radiation. In this way, for instance, a prerequisite is provided for executing the inventive method with the apparatus in an automatized manner.

The inventive calibration unit is a calibration unit for calibrating an apparatus for manufacturing a three-dimensional object by layer-wise solidification of a building material at the positions corresponding to the cross-section of the object to be manufactured in a respective layer, wherein the calibration unit detects an irradiation pattern in a spatially resolved manner. The apparatus comprises a build space, in which a build area is provided and in which the object is to be manufactured layer by layer by selectively solidifying the building material. The apparatus comprises a solidification device for emitting at least one beam of electromagnetic radiation or at least one particle beam to selective positions of the build area. The calibration unit has a generation unit which, during operation, generates an irradiation pattern on the build area in a layer of the building material or on a target. The calibration unit comprises a detection device with at least one radiation conductor and at least one radiation sensor. The at least one radiation conductor is configured to conduct radiation to a radiation sensor. The calibration unit comprises a coupling-in unit for coupling the electromagnetic radiation which is emitted from the building material or from a target when generating an irradiation pattern into the radiation conductor. The calibration unit comprises a deriving unit for deriving a calibration information on the basis of this detection. In particular, the calibration unit may be used as separate unit in the inventive apparatus for manufacturing a three-dimensional object.

BRIEF DESCRIPTION OF THE DRAWINGS

Further features and expediences of the invention follow from the description of embodiments with reference to the appended drawings.

FIG. 3 is a schematic view of a line pattern according to a further embodiment of the invention.

FIG. 4 is a schematic view of a line pattern according to a further embodiment of the invention.

DETAILED DESCRIPTION OF THE EMBODIMENTS

Figure 1:
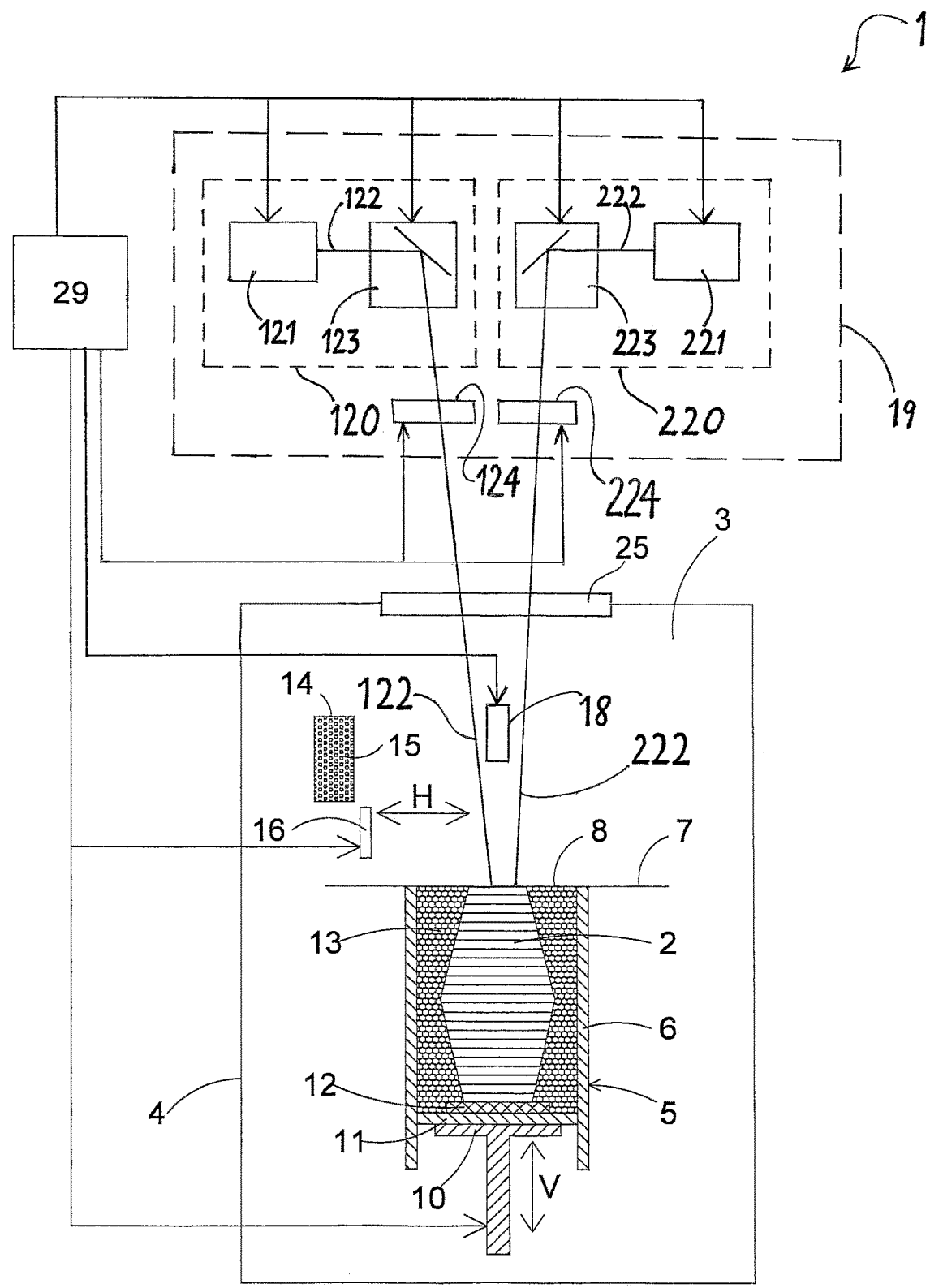
FIG. 1 is a schematic view, partially shown as cross-section, of an apparatus for manufacturing a three-dimensional object by layer-wise selective solidifying of building material according to an embodiment of the invention.

The apparatus shown in FIG. 1 is a laser sintering or laser melting apparatus 1 for manufacturing an object 2.

The apparatus 1 includes a process chamber 3 with a chamber wall 4. In the process chamber 3, a container 5 being open at the top and having a container wall 6 is arranged. A support 10, which can be moved in a vertical direction V, is arranged in the container 5. A base plate 11, which closes the container towards its underside and therefore forms its bottom, is attached to the support 10. The base plate 11 may be a plate which is formed separately from the support 10 and which is fastened to the support 10 or it may be formed monolithically with the support 10. Depending on the powder used and the process used, a building platform 12, on which the object 2 is built, may be attached to the base plate 11. Alternatively, the object 2 may be built on the base plate 11 itself, which then serves as building platform. In FIG. 1, the object 2 to be formed on the building platform in the container 5 below a working plane 7 is shown in an intermediate state. It consists of a plurality of solidified layers and is surrounded by non-solidified building material 13.

The apparatus 1 furthermore contains a storage container 14 for building material 15 in powder form, which can be solidified by electromagnetic radiation, and a recoater 16, which is movable in a horizontal direction H, for applying the building material 15 to a build area 8 in the working plane 7. At the top, the wall of the process chamber 3 comprises a coupling window 25 for the radiation for solidifying the powder 15.

The apparatus 1 further comprises a solidification device 19 with two irradiation devices 120, 220. Each of the beams 122, 222 generated by the radiation sources 121, 221, for example laser sources, are deflected by a deflecting device 123, 223 and focused by way of one of the focusing devices 124, 224 via the coupling window 25 onto the build area 8 in the working plane 7. A deflecting device 123, 223 comprises, for example, a pair of galvanometer scanners.

Figure 2:
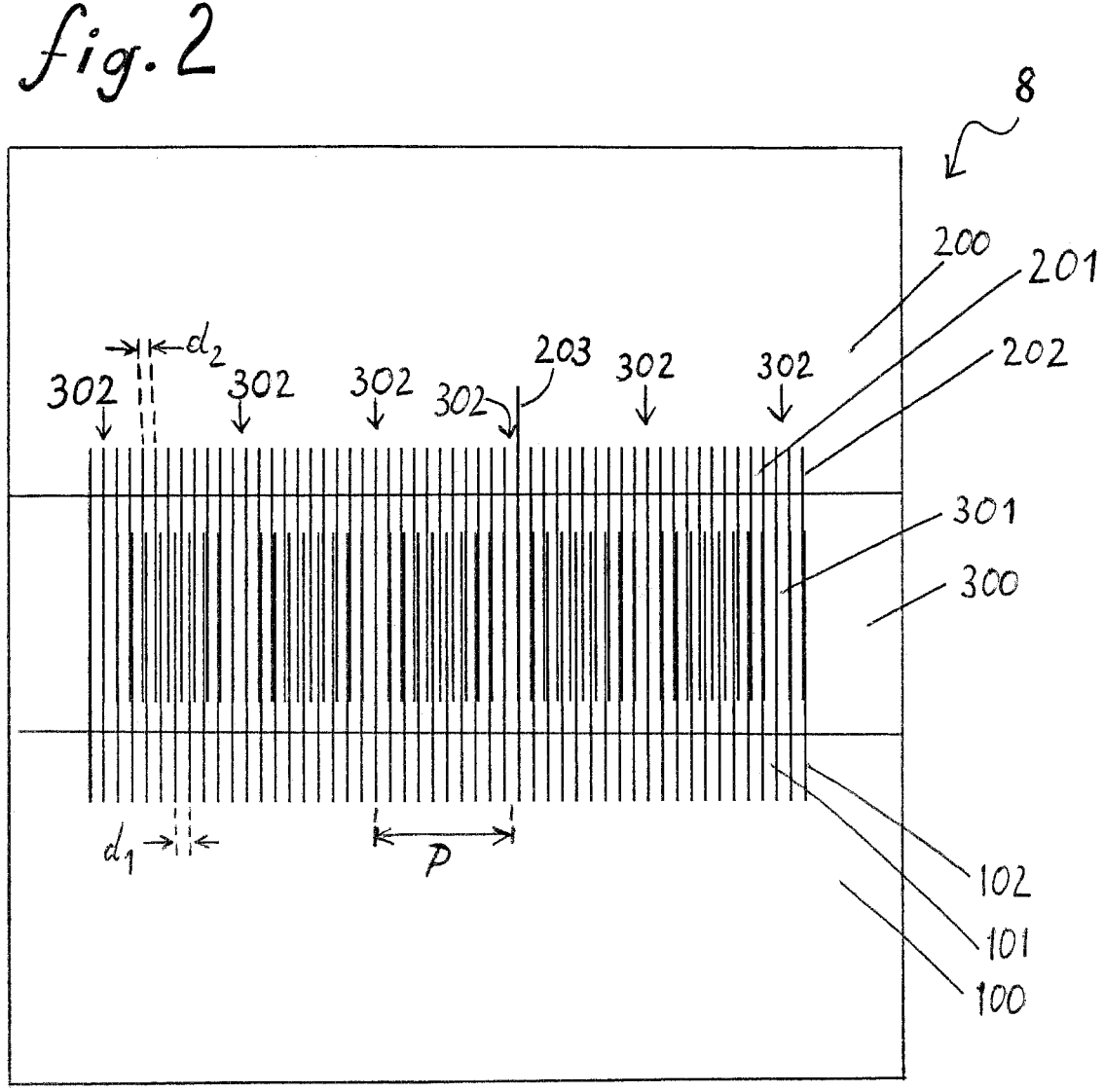
FIG. 2 is a schematic view of the first sub-area of the build area with a first modulation pattern, the second sub-area of the build area with a second modulation pattern, and the overlap zone between the first and the second sub-area with a superposition pattern according to an embodiment of the invention.

As shown in FIG. 2, the build area 8 is divided into two sub-areas 100, 200, each of which is assigned to one of the deflecting devices 123, 223. Each of the beams 122, 222 is thus deflected by the respective deflecting device 123, 223 such that it strikes selective positions in the respective sub-area 100, 200 of the build area 8. The sub-areas 100, 200 overlap in the overlap zone 300. In the overlap zone 300, both beams 122, 222 can strike the build area.

In the context of the invention, there are possible embodiments in which the solidification device 19 comprises another number of irradiation devices, for instance, four irradiation devices. The build area 8 is preferably divided into a number of sub-areas which corresponds to the number of irradiation devices.

In the context of the invention, there are possible embodiments, in which not every irradiation device 120, 220 has a separate beam source, but in which a beam splitter is provided which splits a beam generated by a beam source into partial beams, which are coupled into different irradiation devices 120, 220.

The apparatus 1 further comprises a control device 29, by way of which the individual component parts of the apparatus 1 are controlled in a coordinated manner for executing the manufacturing process. The control device 20 may comprise a CPU, the operation of which is controlled by a computer program (software).

The apparatus 1 comprises at least one generation unit for generating of substantially periodic modulation patterns 101, 201 on a layer of building material 15 applied to the build area 8 or on a target applied to the build area 8. It is preferred to use the irradiation devices 120, 220 as generation units, i.e. to generate the substantially periodic modulation patterns 101, 201 by means of the solidification device 19. In the context of the invention, however, it is also possible to provide at least one generation unit being independent from the solidification unit 19.

The apparatus 1 comprises at least one detection device 18 for detecting irradiation patterns generated on the build area. The detection device 18 is, for example, a camera which is preferably sensitive in the infrared and/or visible spectral range and which is configured to detect at least a part of the build area 8 in a spatially resolved manner. The camera may be configured such that it detects radiation which is emitted in the course of irradiating or as a consequence of irradiating the building material 15 or a target (cf. FIG. 3). Alternatively, the camera can be configured such that it detects a temporary or permanent change of the building material 15 or the target. It may also be implemented that the detection device 18 comprises at least one radiation sensor, being sensitive preferably in the infrared and/or visible spectral range, and at least one radiation conductor. A radiation conductor is an optical element or a combination of a plurality of optical elements, e.g. light conductors, lenses, mirrors, prisms, and/or beam splitter.

The apparatus 1 comprises a determination unit, which determines the deviation of a superposition pattern 301 from a reference position on the basis of data transmitted from the detection unit 18. Preferably, the determination unit is included in the control unit 29. For instance, the determination unit is formed by a program routine, which is executed by the control unit 29 in order to determine the deviation.

During operation, the apparatus 1 is typically calibrated prior to the manufacture of a three-dimensional object 2. In the context of the invention, it is also possible that the apparatus 1 is calibrated once or multiple times during manufacturing a three-dimensional object 2. In the context of the invention, it is even possible that calibrating of the apparatus 1 takes place after and/or during the manufacture of a three-dimensional object, for instance, in order to control the previous manufacturing process.

In order to calibrate the apparatus 1, an substantially periodic first and an substantially periodic second modulation pattern 101, 201 are generated as irradiation patterns in each sub-area 100, 200 of the build area 8 by means of the beams 122, 222, wherein the beams 122, 222 irradiate the positions which correspond to the respective modulation pattern 101, 201 in a layer of the building material 15 applied to the build area 8. A target which is arranged such that its upper side lies on the build area 8 may be irradiated instead of irradiating a layer of the building material 15. The target may, for example, be a plate-like piece of metal, for instance, made of steel or anodized or varnished aluminum, respectively. The modulation patterns 101, 201 are arranged on the build area such that they form a superposition pattern 301 in the overlap zone.

The modulation patterns 101, 201 are periodic patterns. Preferably, the modulation patterns 101, 201 are line patterns, which are preferably formed from lines having substantially equal width, being created by irradiated positions and being arranged in an substantially constant distance from one another. The distance between two neighboring lines of the first modulation pattern 101 is $d_1$. The distance between two neighboring lines of the second modulation pattern 201 is $d_2$. The distances $d_1$ and $d_2$ are similar but not equal. The lines of the first modulation pattern 101 and the lines of the second modulation pattern 201 are substantially parallel. Due to the Moiré-effect, an substantially periodic superposition pattern 301 forms in the overlap zone 300.

In FIG. 2, the modulation patterns 101, 201 and the superposition pattern 301 in the overlap zone 300 are schematically represented by light/dark contrasts. The superposition pattern 301 is characterized by maxima and minima of the line overlap. The maxima of the line overlap correspond to the centres of the brighter areas along the superposition pattern 301. The positions of the maxima of the line overlap in the direction perpendicular to the lines of the line pattern ("transverse direction") is indicated by arrows 302. The superposition pattern 301 is periodic. The period P corresponds to the distance between two neighboring maxima or two neighboring minima of the line overlap. P is calculated as $$P = d_1 \ast d_2 / |d_1 - d_2|,$$

wherein the absolute value of the difference between $d_1$ and $d_2$ is denoted by $|d_1 - d_2|$.

If the modulation pattern 101 is spatially fixed and if the modulation pattern 201 is shifted in transverse direction by a distance x, the maxima of the line overlap in the superposition pattern 301 are also shifted in transverse direction. The shift of the maxima of the line overlap, however, is greater than the shift of the modulation pattern 201 and corresponds to $$x \ast d_1 / |d_1 - d_2|,$$

i.e. the shift of the modulation pattern 201 is represented by the shift of the superposition pattern 301 in a magnified manner. The magnification ratio is $$d_1 / |d_1 - d_2|.$$

In an analogous manner, a magnification results from each relative movement of the modulation patterns 101, 201 in transverse direction.

The accuracy of the determination of the relative position of the modulation patterns 101, 201 is increased by way of the magnification. The relative position of the modulation patterns 101, 201 is determined by determining the deviation of the position of the superposition pattern 301 from a reference position.

It is preferred that the reference position is defined by a reference mark 203 on the build area 8, wherein the reference mark is generated in a layer of the building material 15 or on the target. The distance between a maximum of the line overlap and the reference mark 203 is determined in order to determine the deviation of the position of the superposition pattern 301 from the reference position.

In a particularly preferred manner, the reference mark 203 is generated together with one of the two modulation patterns 101, 201. In FIG. 2, a reference mark 203 is shown, which is generated in a particularly simple and therefore preferable manner as an extended line of the modulation pattern 201, which has the form of a line pattern.

It is sufficient if a part of one period P of the substantially periodic superposition pattern 301 is present in the build area 8. It is only necessary to ensure that the substantially periodic superposition pattern 301 is sufficiently wide in transverse direction that at least the position of one maximum or one minimum of the line overlap can be determined.

In the context of the invention, it is possible to provide for multiple reference marks 203. Preferably, the reference marks 203 are generated together with one of the modulation patterns 101, 201 or together with both modulation patterns 101, 201, particularly in the form of extended lines.

The superposition pattern 301 and the at least one reference mark 203 are detected by the detection device 18 in a spatially resolved manner. The control device 29 determines the deviation of the superposition pattern 301 from a predefined reference position from the data transmitted from the detection device 18.

If the deviation exceeds a predefined setpoint value, the control device 29 changes one or more settings of the component parts of the apparatus 1 in order to change the deviation such that the deviation does not exceed the predefined setpoint value anymore.

In the context of the invention it is possible to implement the modulation patterns 101, 201 not in the form of line patterns but in the form of different patterns which can form an substantially periodic superposition pattern 301. For instance, dot patterns or grid patterns are suitable modulation patterns 101, 201. With modulation patterns 101, 201 being substantially periodic in multiple directions, such as grid patterns, it is possible to determine a translational displacement in an arbitrary direction and/or a rotation as a deviation of the position of the superposition pattern 301 from a reference position.

In the context of the invention it is possible to execute the detection and determination of the deviation of the position of the superposition pattern 301 from a reference position by means of visual inspection. In this case it is not required that the apparatus 1 comprises a detection device 18 because the user visually determines, for instance, the distance between a maximum of the line overlap and a reference mark 203.

If the solidification device 19 comprises more than two deflecting devices and if more than two sub-areas being respectively assigned to one deflecting device are present in the build area 8, the calibration may be executed in the described manner for every overlap zone between two or more sub-areas.

In the context of the invention it is possible that for calibrating the apparatus 1, the deviation of the position of the superposition pattern 301 from a reference position is determined and that the control commands with which the control device 29 controls the component parts of the apparatus 1 are modified on the basis of the determined deviation in order to balance deviations of the relative position of the sub-areas of the build area and other geometric parameters from the respective setpoint values.

It is furthermore possible to couple electromagnetic radiation which is emitted when generating an irradiation pattern in a layer of building material 15 applied to the build area 8 or when generating an irradiation pattern on a target into a radiation conductor, to conduct it to a radiation sensor by means of this radiation conductor, to detect it with the radiation sensor and to derive calibration information on the basis of the detected radiation. On the basis of the derived calibration information, it is, for instance, tested whether one or more of the optical settings (for example settings which determine the deflection of the radiation emitted from the solidification device, its focusing onto the build area, and the energy density of an emitted beam) have to undergo an adjustment. An adjustment may be executed in an automatic or semi-automatic manner, i.e. without or with the user's cooperation.

With the determination of the period P of the superposition pattern 301, it is possible to determine errors in the settings of the solidification device 19 because a comparison of the actual value with the setpoint value of the period P gives information about whether the actual values of $d_1$ and $d_2$ correspond to the respective setpoint values.

Information about a corresponding deviation in at least one of the modulation patterns 101, 201 is provided if, for instance, differing values of the period P are determined in different areas of the superposition pattern 301. For this, errors of the settings of the solidification device 19, in particular of the focusing devices 124, 224 and of other optical elements of the apparatus 1, may be responsible. It is advantageous for the determination of the period P if the superposition pattern 301 is as long as possible in the transverse direction.

In a specific embodiment, the modulation patterns 101, 201 are line patterns with a length of 60 mm being measured in a direction perpendicular to the direction of the lines. The modulation pattern 101 has 240 equidistant lines. The modulation pattern 201 has 241 equidistant lines. The central line of the lines of the modulation pattern 201 is made longer compared to the other lines, wherein the extension forms a reference mark 203 lying outside of the overlap zone 300.

In another specific embodiment, the focusing of the laser beams 122, 222, which are emitted to the build area 8 in an apparatus 1 for laser sintering or laser melting for solidifying building material 15, is tested and, possibly, adjusted. Preferably, the testing and the possible adjustment are executed separately for each laser beam 122, 222. Hence, the test and the possible adjustment may be carried out in a completely analogous manner also for apparatuses 1, which have only one deflecting device for one laser beam, as well as for apparatuses 1 with more than two deflecting devices for a respective laser beam. For testing the focusing, a pate-like target 9, which is made of anodized aluminium, is placed on the support 10 or the base plate 11. By means of one of the lasers 122, 222 a line pattern 400 consisting of substantially parallel lines is generated as an irradiation pattern. The line pattern being schematically shown in FIG. 3 consists of the lines 410, 411, 412, 413, 414. The line pattern 400 may comprise considerably more than five lines. Between generating the individual lines, the support 10 is always moved in direction V such that lines 413, 411, 410, 412, 414 following each other in transverse direction are generated at further and further raised positions of the support 10. Only when generating the central line 410, which is made longer than the other lines for the sake of better identification, the support is in such a position that the upper side of the target 9, on which the pattern 400 is generated, lies in the working plane 7. The narrower the laser is focused when it irradiates the build area 8 for generating a line, the narrower the generated line is. The focusing is correctly adjusted if the central line 410 is narrower than the other lines 413, 411, 412, 414. This situation is shown in FIG. 3A. In FIG. 3B, a situation is shown in which the focusing is not correctly adjusted, which may be seen from the fact that a line 411 being distant from the centre is narrower than the other lines 413, 410, 412, 414. The electromagnetic radiation which is emitted from the corresponding positions of the target 9 when generating the pattern 400 is conducted to a radiation sensor, which detects the radiation and which thereby automatically detects the line pattern 400. The control device 29 automatically determines the width of the lines 410, 411, 412, 413, 414 and automatically ascertains whether the focusing is correct. If necessary, the control device 29 automatically executes an adjustment of the components of the apparatus 1 which are relevant for the focusing, e.g. an adjustment of the focusing devices 123, 223. The necessary extent of the correction may be automatically derived from the line distances.

In a further embodiment, settings of the deflecting devices 123, 223 are tested with respect to hatching lines and, possibly, the deflecting devices 123, 223 are adjusted. Preferably, the testing and the possible adjustment are executed separately for each laser beam 122, 222. Hence, the test and the possible adjustment may be carried out in a completely analogous manner for apparatuses 1, which have only one deflecting device for one laser beam, as well as for apparatuses 1 with more than two deflecting devices for a respective laser beam. Hatching lines can be used in order to solidify an extensive area of the build area 8. Hatching lines are parallel lines which extend from one boundary of the area to be solidified to its opposite boundary and along which the building material 15 is solidified. For generating hatching lines, a laser beam is moved such that the position at which it strikes the build area 8 moves to and fro between one boundary of the area to be solidified and the opposite boundary. The laser beam may be switched off during the change of the direction in order to avoid that undesirably high input of energy into the building material locally occurs at a position at which a directional change is executed. For testing whether the direction of the laser beam is changed at the respective correct position, a line pattern 500 of substantially parallel and substantially equally long lines 501 is generated as irradiation pattern by means of one of the lasers 122, 222 in a layer of building material 15 applied to the building area 8. These lines 501 are generated in such a manner as described above for the hatching lines. However, it is preferred that the lines have a distance from one another which is larger than the normal distance between hatching lines. In addition, a line 600 is generated which is oblique relative to the lines 501 of the line pattern 500 and which is placed at one side of the line pattern 500. A part of the lines 501 intersect the line 600 such that a series of points of intersection 700, 701, 702, 703 results.

Preferably, the line 600 has an angle to the lines 501 which is close to 90 degrees. The points of intersection 700, 701, 702, 703 may be detected in an easier and more accurate way than the length of the lines 501 by visual inspection as well as by automatic detection. The position of the last point of intersection 703 of the series provides information about the length of the lines 501. This is schematically shown in FIG. 4. The electromagnetic radiation which is emitted from the corresponding positions of the building area 8 when generating the line pattern 500 and the line 600 is conducted to a radiation sensor, which senses the radiation and which detects the irradiation pattern. The control device 29 automatically detects the position of at least the last point of intersection 703 of the series and from this, it automatically determines the length of the lines 501 and compares the latter with a setpoint value. Possibly, the control device 29 automatically carries out an adjustment, e.g., an adjustment of the deflecting devices 123, 223.

While the present invention was described on the basis of apparatuses 1 for laser sintering or laser melting, it is not limited to laser sintering or laser melting. It may be applied to any possible method for producing a three-dimensional object 2 by layer-wise applying and selectively solidifying a building material.

The solidification device 19 may, for instance, comprise one or more gas lasers, solid-state lasers, or lasers of any other kind, e.g. laser diodes, especially VCSEL (Vertical Cavity Surface Emitting Laser), VECSEL (Vertical External Cavity Surface Emitting Laser), or an array of these lasers. In general, as solidification device 19, any device may be used, with which energy can be selectively applied to a layer of the building material 15 in the form of wave radiation or particle radiation. Instead of a laser, for example, any other light source, an electron beam, or any other energy source or radiation source being suitable for solidifying the building material 15 may be used. Instead of deflecting a beam, the irradiation may be carried out with a moveable line irradiator. Also the selective mask sintering, in which a mask and an expanded light source are used, or the high-speed sintering (HSS), in which a material is selectively applied to the building material 15, which increases (absorption sintering) or decreases (inhibition sintering) the absorption of radiation at the positions corresponding to the cross-section of the object.

Instead of introducing energy, the selective solidifying of the applied material may also take place by means of 3D printing, e.g. by applying an adhesive. The invention generally relates to producing an object 2 by means of layer-wise applying and selectively solidifying a building material 15, irrespective of the way and manner how the building material 15 is solidified.

As building material 15 different types of powder may be used, in particular metal powders, plastic powders, ceramic powders, sand, filled or mixed powders. In the context of stereolithography, the use of liquid building materials is also possible.

The invention claimed is:

1. A method for calibrating an apparatus for manufacturing a three-dimensional object by layer-wise solidification of building material at positions corresponding to a cross-section of the object to be manufactured in a respective layer with a build space, in which a build area is provided and in which the object is to be built layer by layer by solidifying the building material, wherein the build area comprises at least a first sub-area and a second sub-area, which overlap in an overlap zone, and a solidification device for emitting beams of electromagnetic radiation or particle beams to selective positions of the build area, the method comprising:
generating a substantially periodic first modulation pattern in a layer of the building material or on a target in the first sub-area of the build area;
generating a substantially periodic second modulation pattern in a layer of the building material or on a target in the second sub-area of the build area, wherein in the overlap zone, the first modulation pattern and the second modulation pattern form a substantially periodic superposition pattern whose period is larger than a period of the first modulation pattern and a period of the second modulation pattern;
detecting the superposition pattern; and
determining a deviation of a position of the superposition pattern on the build area from a reference position.

2. The method according to claim 1, further comprising generating line patterns, grid patterns or dot patterns as the substantially periodic first or second modulation patterns.

3. The method according to claim 1, wherein the reference position is defined by at least one reference mark on the build area, wherein the at least one reference mark is generated by the solidification device in a layer of the building material or on a target.

4. The method according to claim 1, further comprising emitting beams of laser radiation by the solidification device, wherein different beams are emitted from different radiation sources or generated from the radiation emitted from one radiation source by beam splitting.

5. The method according to claim 1, further comprising changing the position of the first modulation pattern and/or the second modulation pattern on the build area such that the deviation of the position of the superposition pattern on the build area from a reference position has a value not exceeding a setpoint value.

6. The method according to claim 1, wherein the determination of the deviation of the position of the superposition pattern on the build area from the reference position comprises determining a displacement and/or a rotation, wherein on a basis of the determination of the displacement and/or rotation, a change of the position of the first and/or second modulation pattern is carried out.

7. The method according to claim 1, wherein the method is executed prior to and/or during and/or after a manufacturing a three-dimensional object.

8. The method according to claim 1, wherein the determination of the deviation of the position of the superposition pattern on the build area from the reference position comprises an automatic sensor-based detection with a detection device, the detection device comprising at least one radiation conductor and at least one radiation sensor.

9. The method according to claim 1, further comprising deriving modified control commands for the operation of the apparatus for the manufacture of the object to be manufactured, wherein the deriving is on the basis of the determined deviation of the position of the superposition pattern on the build area from the reference position in an automatic or semi-automatic way.

10. A method for calibrating an apparatus for manufacturing a three-dimensional object by layer-wise solidification of building material at positions corresponding to a cross-section of the object to be manufactured in a respective layer, in which method an irradiation pattern is detected in a spatially resolved manner, wherein the apparatus comprises a build space, in which a build area is provided and in which the object is to be built by selectively solidifying the building material, a solidification device for emitting at least one beam of electromagnetic radiation or at least one particle beam to selective positions of the build area, and a detection device with at least one radiation sensor, the method comprising:

generating an irradiation pattern on the build area in a layer of the building material or on a target;

conducting an electromagnetic radiation that is emitted from the building material or the target when generating the irradiation pattern to the radiation sensor;

detecting the radiation by the radiation sensor; and deriving calibration information on the basis of the step of detecting.

11. The method according to claim 10, further comprising adjusting a focus setting, automatically or semi-automatically, using the calibration information.

12. An apparatus for manufacturing a three-dimensional object by layer-wise solidification of a building material at positions corresponding to a cross-section of the object to be manufactured in a respective layer with a build space, in which a build area is provided and in which the object is to be built in a layer-wise manner by selectively solidifying the building material, wherein the build area comprises at least a first sub-area and a second sub-area that overlap in an overlap zone, and a solidification device for emitting beams of electromagnetic radiation or particle beams to selective positions of the build area, the apparatus comprising:

a generation unit that generates a substantially periodic first modulation pattern in a layer of the building material or on a target in the first sub-area of the build area during operation;

a generation unit that generates a substantially periodic second modulation pattern in a layer of the building material or on a target in the second sub-area of the build area during operation, wherein in the overlap zone, the first modulation pattern and the second modulation pattern form a substantially periodic superposition pattern, whose period is larger than a period of the first modulation pattern and a period of the second modulation pattern;

a detection device that is configured to detect the superposition pattern; and a determination unit that, during operation, determines a deviation of the position of the superposition pattern on the build area from a reference position.

13. The apparatus according to claim 12, wherein the solidification device comprises at least a first deflecting device and a second deflecting device for deflecting a first and a second beam emitted from the solidification device, wherein the first sub-area of the build area is assigned to the first deflecting device and the second sub-area of the build area is assigned to the second sub-area of the build area.

14. The apparatus according to claim 12, wherein the detection device comprises a sensor that detects the radiation striking the overlap zone in a spatially resolved manner by detecting changes of a property of the building material or the target occurring as consequence of the incident radiation.

15. A calibration unit for calibrating an apparatus for manufacturing a three-dimensional object by layer-wise solidification of a building material at the positions corresponding to a cross-section of the object to be manufactured in a respective layer, wherein the calibration unit detects an irradiation pattern in a spatially resolved manner, wherein the apparatus comprises a build space, in which a build area is provided and in which the object is to be built layer by layer by selectively solidifying the building material, and a solidification device for emitting at least one beam of electromagnetic radiation or at least one particle beam to selective positions of the build area, the calibration unit comprising:

a generation unit that, during operation, generates the irradiation pattern on the build area in a layer of the building material or on the target;

a detection device with at least one radiation conductor and at least one radiation sensor, wherein the at least one radiation conductor is configured to conduct radiation to a radiation sensor and wherein the radiation sensor is configured to detect an electromagnetic radiation that is emitted from the building material or from a target when generating the irradiation pattern;

a coupling-in unit for coupling the electromagnetic radiation emitted from the building material or from a target when generating the irradiation pattern into the radiation conductor; and a deriving unit for deriving calibration information on the basis of the electromagnetic radiation emitted from the building material or from the target when generating the irradiation pattern detected by the radiation sensor.

* * * * *